United States Patent
Rehschuh

(10) Patent No.: US 9,623,927 B2
(45) Date of Patent: Apr. 18, 2017

(54) BAGGAGE CONTAINER FOR A MOTORCYCLE

(75) Inventor: Rainer Rehschuh, Au (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 248 days.

(21) Appl. No.: 11/951,711

(22) Filed: Dec. 6, 2007

(65) Prior Publication Data

US 2008/0073397 A1    Mar. 27, 2008

Related U.S. Application Data

(63) Continuation of application No. PCT/EP2006/004248, filed on May 6, 2006.

(30) Foreign Application Priority Data

Jun. 7, 2005   (DE) .................. 10 2005 026 053
Jul. 7, 2005   (DE) .................. 10 2005 031 716

(51) Int. Cl.
  *B62J 9/00*   (2006.01)
  *B62J 7/04*   (2006.01)
  *B62J 23/00*  (2006.01)

(52) U.S. Cl.
  CPC .................. *B62J 9/001* (2013.01); *B62J 7/04* (2013.01); *B62J 9/00* (2013.01); *B62J 23/00* (2013.01)

(58) Field of Classification Search
  CPC ....... B62J 7/04; B62J 9/00; B62J 9/001; B62J 23/00
  USPC ....... 224/316, 413, 433, 325–327, 424, 430, 224/454; 296/180.1; 180/903; D12/181,
  (Continued)

(56) References Cited

U.S. PATENT DOCUMENTS 1,929,433 A * 10/1933 Kenny ..................... 220/767
3,329,323 A *  7/1967 Tanaka .................... 224/442
3,495,749 A *  2/1970 Meadowcroft ........... 224/457
(Continued)

FOREIGN PATENT DOCUMENTS

DE    3419430 A1 * 11/1985
EP     462511 A1 * 12/1991
(Continued)

OTHER PUBLICATIONS

"Honda Originalzubehör 2001, 2001 Honda Motor Europe, Offenbach XP002396604, Seite 3 Seite 5".
(Continued)

*Primary Examiner* — Justin Larson
*Assistant Examiner* — Scott McNurlen
(74) *Attorney, Agent, or Firm* — Crowell & Moring LLP

(57) ABSTRACT

A baggage container for a motorcycle is described. The baggage container includes an internal wall, which faces toward the motorcycle when the baggage container is attached to the motorcycle, an external wall at a distance from the internal wall, a front wall, which faces toward a forward area of the motorcycle when the baggage container is attached to the motorcycle, a rear wall, which faces toward a rear area of the motorcycle when the baggage container is attached to the motorcycle, and two side walls, which each extend between the internal wall and the external wall. An air guiding element which guides travel wind flowing along the external wall in a predefined direction, is situated in a transition area between the external wall and the rear wall.

12 Claims, 3 Drawing Sheets

(58) Field of Classification Search
USPC ............... D12/407, 114; 220/696, 768, 771; 190/39, 115
See application file for complete search history.

(56) References Cited

U.S. PATENT DOCUMENTS

| | | | | |
|---|---|---|---|---|
| 3,971,452 | A | * | 7/1976 | Morelli ........................ 296/180.1 |
| D246,644 | S | * | 12/1977 | McCarroll ...................... D12/181 |
| 4,260,084 | A | * | 4/1981 | Warren, Jr. ...................... 224/430 |
| 4,308,983 | A | * | 1/1982 | Yoshida ........................ 224/316 |
| 4,393,986 | A | * | 7/1983 | Sirey ............................ 224/443 |
| 4,402,378 | A | * | 9/1983 | Amick ........................... 180/210 |
| 4,809,891 | A | * | 3/1989 | Patrin ............................ 224/527 |
| 4,822,067 | A | * | 4/1989 | Matsuo et al. .............. 280/152.1 |
| D318,448 | S | * | 7/1991 | Itakura et al. ................. D12/181 |
| 5,301,829 | A | * | 4/1994 | Chrisco .......................... 220/521 |
| 5,406,465 | A | * | 4/1995 | Farchione ...................... 362/473 |
| 5,409,287 | A | * | 4/1995 | Suzuki ........................ 296/180.1 |
| 5,558,260 | A | * | 9/1996 | Reichert ........................ 224/413 |
| D409,963 | S | * | 5/1999 | Mobius et al. ............... D12/181 |
| 6,505,765 | B1 | * | 1/2003 | Proctor et al. ................. 224/413 |
| 2003/0066854 | A1 | * | 4/2003 | Heinrich et al. ............... 224/413 |
| 2003/0178458 | A1 | * | 9/2003 | Trambley et al. ............. 224/326 |
| 2004/0149792 | A1 | * | 8/2004 | Akita et al. .................... 224/413 |
| 2005/0161483 | A1 | * | 7/2005 | Krohn et al. .................. 224/413 |

FOREIGN PATENT DOCUMENTS

| | | | |
|---|---|---|---|
| JP | 03167087 A | * | 7/1991 |
| JP | 04201792 A | * | 7/1992 |

OTHER PUBLICATIONS

International Search Report dated Sep. 11, 2006 w/English translation of pertinent portion; Form PCT/ISA/237; and Form PCT/ISA/237 and Supplementary Sheet pp. 1 and 2 w/English translation (ten (10) pages).

Notification of First Office Action issued by the People's Republic of China dated Nov. 7, 2008.

Notification of Second Office Action issued by the People's Republic of China dated Jul. 17, 2008.

* cited by examiner

BAGGAGE CONTAINER FOR A MOTORCYCLE

CROSS REFERENCE TO RELATED APPLICATIONS

This application is a continuation of PCT International Application No. PCT/EP2006/004248, filed May 6, 2006, which claims priority under 35 U.S.C. §119 to German Patent Application No. 10 2005 026 053.5 filed Jun. 7, 2005 and to German Patent Application No. 10 2005 031 716.2 filed Jul. 7, 2005, the entire disclosures of which are herein expressly incorporated by reference.

BACKGROUND AND SUMMARY OF THE INVENTION

The present invention relates to a baggage container for a motorcycle having walls including an internal wall, which faces toward the motorcycle when the baggage container is attached to the motorcycle, an external wall disposed at a distance from the internal wall, a front wall, which faces toward a forward area of the motorcycle when the baggage container is attached to the motorcycle, a rear wall, which faces toward a rear area of the motorcycle when the baggage container is attached to the motorcycle and two side walls, each extending between the internal wall and the external walls. The invention also relates to a motorcycle equipped with such a baggage container as described above.

In many motorcycles, the rear area of the motorcycle tends to get relatively dirty. Above all in motorcycles which are equipped with side cases or with a top case, a strong partial vacuum arises in the area of the rear lights, turn signals, and the license plate at high velocities, which draws dirt particles out of the air. The dirt particles accumulate on the headlights, turn signals, the license plate, as well as on the motorcycle and/or on the rear of the top case and the side cases.

The present invention provides a baggage container which, when used, reduces the contamination problem, and which may, for example, include a top case which is attached from above to a motorcycle in the rear of the baggage bridge of the motorcycle, or a side case which is attached laterally in the area of the rear wheel of the motorcycle. The exemplary baggage container may have an internal wall, which faces toward the motorcycle when the baggage container is attached to the motorcycle. In an exemplary top case, the internal wall corresponds to the floor of the top case. In an exemplary side case, the internal wall corresponds to the side wall of the side case facing toward the motorcycle. The baggage container also may have an external wall. The external wall is the wall of the baggage container which is diametrically opposite the internal wall. In addition, the baggage container may have a front wall, which, when the baggage container is attached to the motorcycle, faces toward a forward area of the motorcycle. A rear wall of the back container faces toward a rear area of the motorcycle when the baggage container is attached to the motorcycle. The rear wall thus lies "opposite" the front wall. A side wall extends in each case between the internal wall and the external wall or between the front wall and the rear wall.

One exemplary preferred embodiment of the present invention includes an air guiding element situated in the transition area between the external wall and the rear wall, which deflects travel wind flowing along the external wall in a predefined direction in such a way that the contamination of the rear wall of the baggage container as well as the entire rear area of the motorcycle is minimized.

The exemplary air guiding element is preferably designed and situated in such a way that it deflects the travel wind flowing along the exterior side toward the rear wall. The air guiding element thus reduces the partial vacuum in the entire rear area of the motorcycle in a targeted way.

According to an additional embodiment of the present invention, the transition area between the external wall and the rear wall of the baggage container is convexly curved. The deflection of the travel wind toward the rear wall of the baggage container is thus improved.

The air guiding element may be situated at a predefined distance from the wall sections of the baggage container forming the transition area, similarly as is the case in wing-like rear spoilers of passenger automobiles. The air guiding element preferably has a cross-section curved like an airfoil or lamella, i.e. a flat plate.

The radius of curvature of the transition area between the external wall and the rear wall of the baggage container is preferably essentially equal to the radius of curvature of the air guiding element or the center line of the air guiding element.

It is noted that multiple air guiding elements of this type may also be situated on the baggage container. The air guiding elements may be situated one above another and may be slightly offset in the travel direction of the motorcycle, which further improves the deflection of the travel wind.

Retention jaws or retention lugs may be situated on the baggage container for attaching the air guiding element. Thus, for example, a first retention element projecting from the external wall may be provided in a transition area between one side wall and the external wall of the baggage container, and a second retention element projecting from the external wall may be provided in a transition area between the other side wall and the external wall. The two ends of the air guiding element may be attached to the retention element. The air guiding element, the retention elements, and the baggage container may be connected to one another in one piece. A part of the baggage container, the retention elements, and the air guiding element may be produced as an injection molded part, for example. Alternatively thereto, the retention elements and the air guiding element may also be glued, screwed, or otherwise attached to the baggage container.

The "retention elements" projecting from the external wall not only have a function of a retention element in the actual meaning, but rather also may have the function of air guiding elements. Namely, they ensure that the travel wind flowing between them does not escape laterally from the "shaft" that they form. They thus "channel" the travel wind flowing along the exterior side toward the rear wall.

The external wall of the exemplary baggage container may be preferably situated in relation to the internal wall in such a way that the external wall sinks slightly toward the rear wall. "Slightly" in this context means that the external wall sinks precisely by an amount sufficient that eddies of the air are avoided, and a largely laminar airflow is achieved.

In a different exemplary embodiment, the air guiding element may be situated so it is pivotable.

The exemplary air guiding element may be preferably situated in such a way that the flow cross-section formed by the external wall, the two "lateral" retention elements, and the air guiding element tapers in the flow direction of the air, i.e., toward the rear wall. In this way, the air "under" the air guiding element is additionally accelerated, which further reduces the danger of contamination of the rear wall.

The "retention elements" projecting from the external wall, cited above, which have the function of air guiding elements, form an important element of a cost-effective embodiment of the present invention, in combination with a "sinking external wall." The contamination of the rear wall may already be very significantly reduced solely by the "retention elements" projecting from the external wall and an external wall slightly sinking toward the rear wall, without an air guiding element necessarily having to be provided.

Other objects, advantages and novel features of the present invention will become apparent from the following detailed description of the invention when considered in conjunction with the accompanying drawings.

BRIEF DESCRIPTION OF THE DRAWINGS

In the following, the present invention is explained in greater detail in connection with the drawing.

DETAILED DESCRIPTION OF THE DRAWINGS

Figure 1:
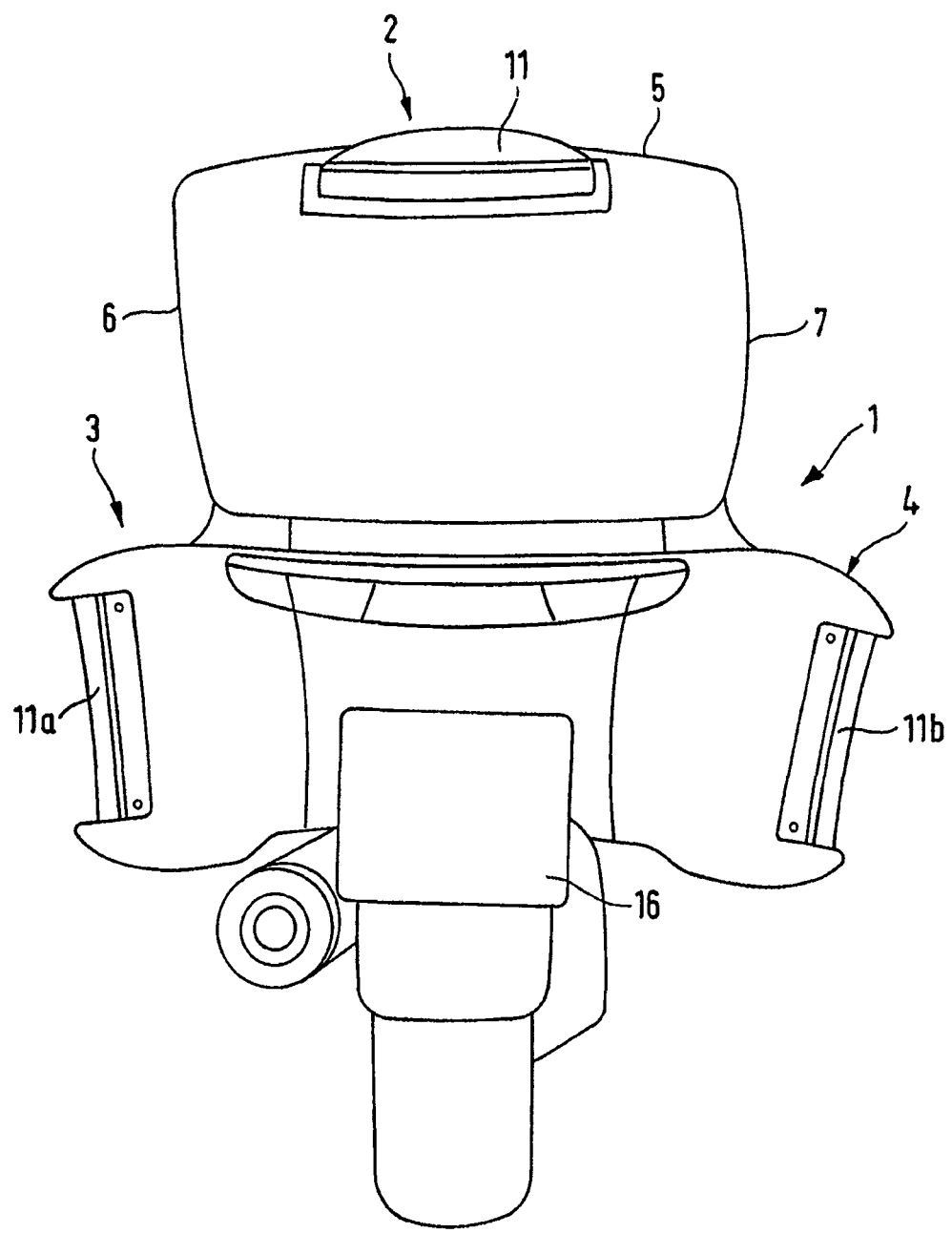
FIG. 1 shows a rear view of a motorcycle, which is equipped with a top case and two side cases.

FIG. 1 shows a rear view of a motorcycle 1, which is equipped with a top case 2, a left side case 3, and a right side case 4 according to exemplary embodiments of the invention. The top case 2 is attached to a baggage bridge situated above the rear wheel of the motorcycle. The two side cases 3, 4 are attached to the motorcycle laterally in the area of the rear wheel of the motorcycle.

The exemplary top case 2 may be attached at its bottom or floor side to the baggage bridge. The top side of the top case 2 is also referred to in the following as the exterior wall 5 (cf. FIG. 3). The top side or exterior wall 5 of the top case 2 is connected via side walls 6, 7 to the bottom or floor wall of the top case 2. The top case 2 also has, as may be seen best from FIG. 3, a front wall 8 and a rear wall 9. The front wall 8 faces toward a forward area of the motorcycle when the top case 2 is attached to the motorcycle 1. The rear wall 9 faces toward a rear area of the motorcycle when the top case is attached to the motorcycle 1. An exemplary air guiding element 11 is situated in a transition area 10 (compare FIG. 3) between the external wall 5 and the rear wall 9 of the top case 2.

Figure 2:
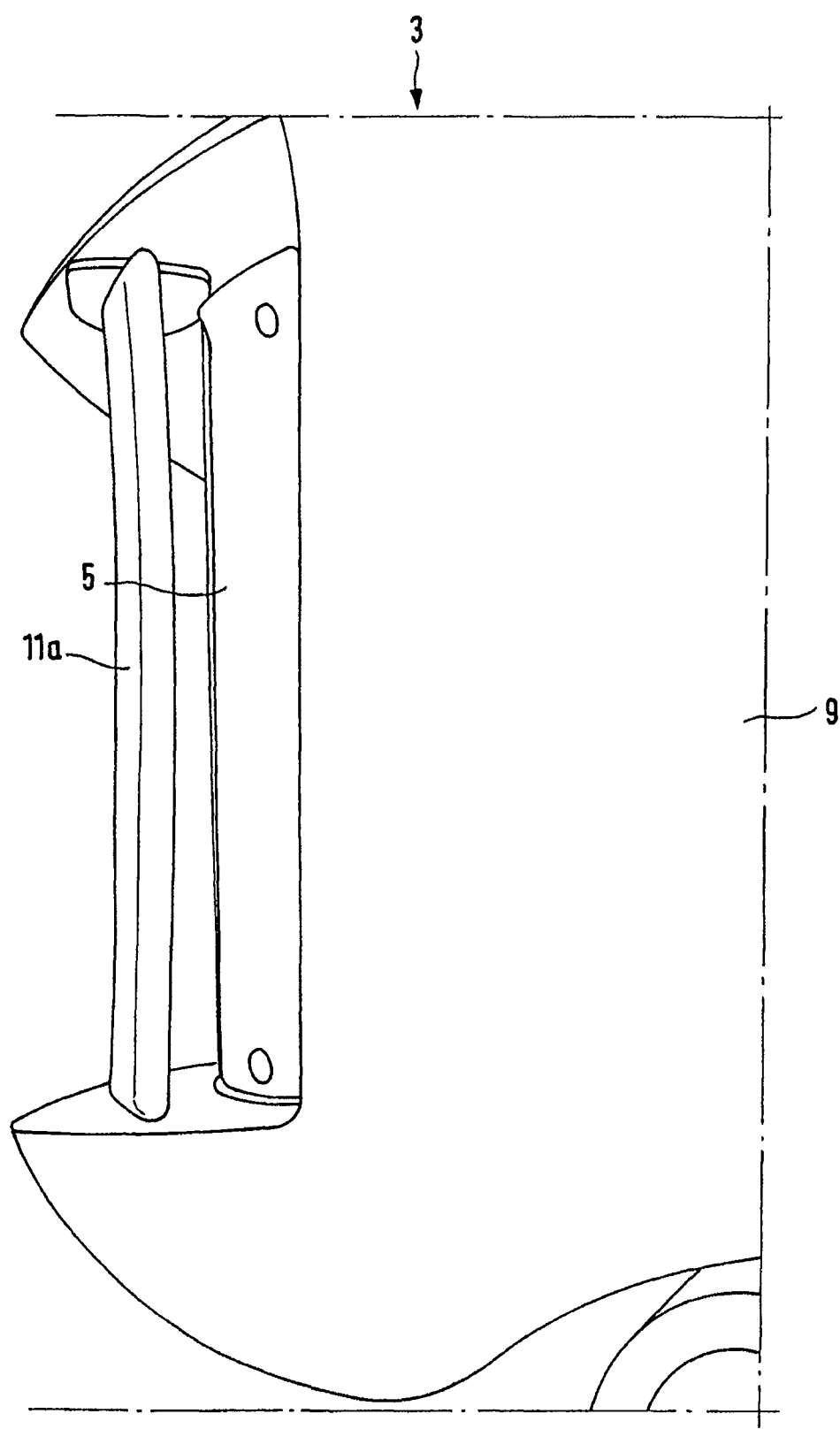
FIG. 2 shows an enlarged illustration of the left side case in the area of the air guiding element.

As may be seen best from FIG. 2, the exemplary air guiding element may have a shape like an airfoil, a flat plate or a lamella. The air guiding element 11 is provided, for example, to deflect travel wind which flows along the external wall 5, i.e., along the top side of the top case 2, downward toward the rear side 9 of the top case 2. The partial vacuum in the area behind the top case 2 is thus reduced and therefore also the danger that the rear area of the motorcycle 2 and/or the top case 2 and the side cases 3, 4 will be contaminated.

Figure 3:
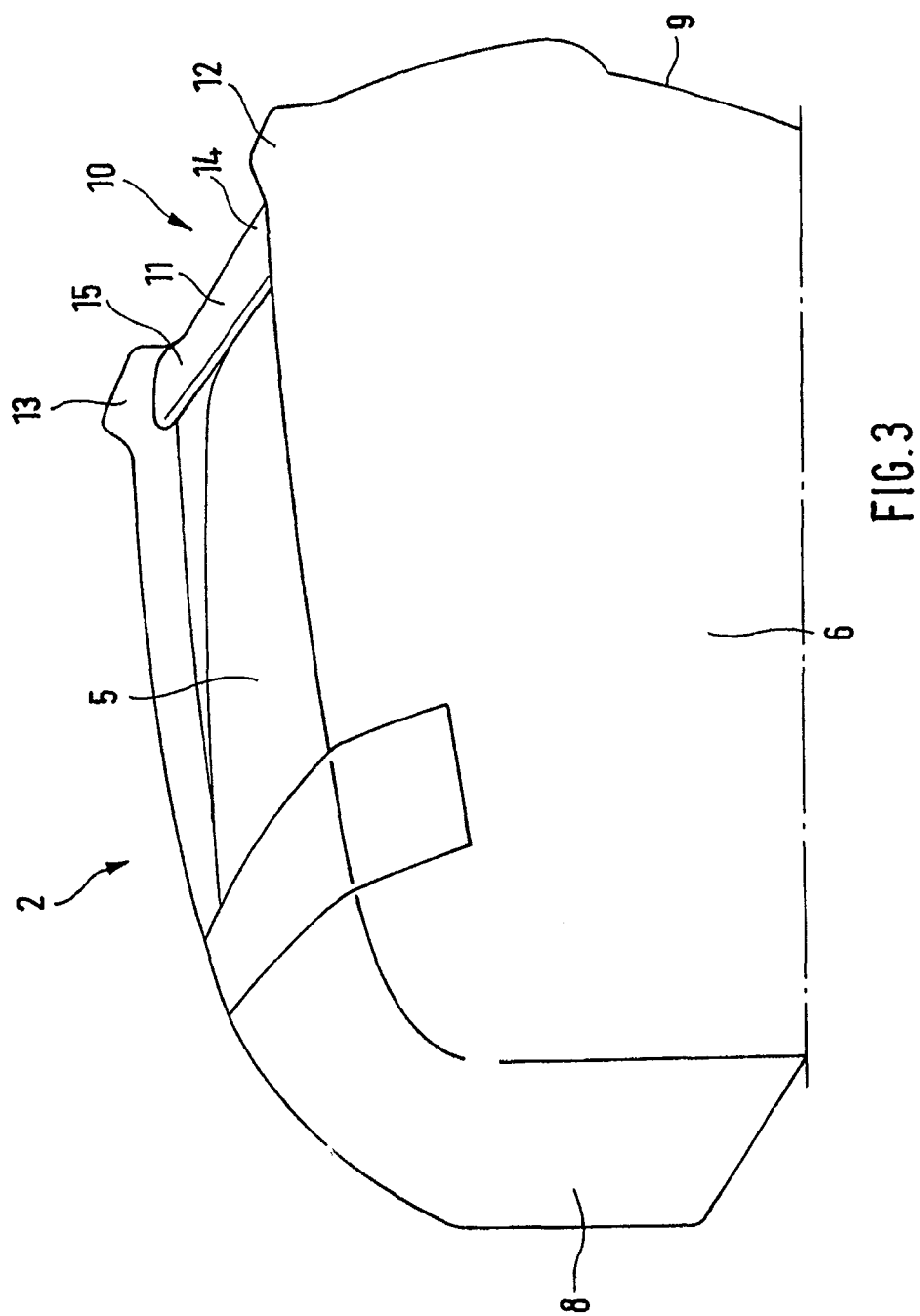
FIG. 3 shows a perspective illustration of a top case according to an embodiment of the present invention.

As may be seen from FIG. 3, a first lug-like retention element 12 is provided in the rear transition area of the side wall 6 and the external wall 5 of the top case 2. Such a lug-like retention element may also be provided in the right rear transition area of the side wall concealed in FIG. 3 and the external wall 5. This second lug-like retention element is identified by the reference numeral 13. The two ends 14, 15 of the exemplary air guiding element are each attached to one of the two retention elements 12 or 13. The exemplary air guiding element 11 may be situated so it is pivotable on the two retention elements 12, 13 or may be connected and fixed to the retention elements 12, 13. The retention elements 12, 13 may be connected in one piece to the top case. For example, the retention elements 12, 13 and a cover of the top case 2 may be produced as an injection molded part. As an alternative, the retention elements 12, 13 may also be glued, screwed, or attached in another way later to the cover area of the top case 2.

As may be seen from FIG. 1, the two exemplary side cases 3, 4 are also provided with an air guiding element 11a, 11b of this type. The air guiding elements 11a, 11b according to embodiments of the invention are also used for the purpose of redirecting travel wind which flows along the exterior sides of the side cases into the rear area of the motorcycle, or more precisely toward the rear sides of the side cases or in the area of the license plate 16 of the motorcycle 1.

FIG. 2 shows an enlarged illustration of the left side case 3 in the area of the exemplary air guiding element 11a. It may be seen especially clearly from FIG. 2 that the transition area between the external wall 5 and the rear wall 9 of the side case may be rounded and/or convexly curved, because of which the air deflection by the air guiding element 11a is further improved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A baggage container for a motorcycle, comprising:
    an internal wall, which faces toward the motorcycle when the baggage container is attached to the motorcycle;
    an external wall which faces away from the motorcycle when the baggage is attached to the motorcycle, the external wall being located diametrically opposite from the internal wall at a distance from the internal wall;
    a front wall, which faces toward a forward area of the motorcycle when the baggage container is attached to the motorcycle;
    a rear wall, which faces toward a rear direction relative to the motorcycle when the baggage container is attached to the motorcycle;
    two side walls, which each extend between the internal wall and the external wall;
    a transition area between the external wall and the rear wall having a convexly curved shape, and
    an air guiding element, for guiding a travel wind flowing along the external wall toward a center of a region behind the motorcycle when the baggage container is attached to the motorcycle, wherein the air guiding element is located at its opposite ends on recessed surfaces of one of a recessed region of the external wall and a transition area between the external wall and the rear wall, an axis through the opposite ends of the air guiding element is transverse to a longitudinal axis of the motorcycle when the baggage container is attached to the motorcycle, the air guiding element has an interior side curved concavely like an airfoil, the concave interior side facing toward the transition area of the baggage container, and the opposite ends of the air guiding element meet the recessed surfaces of the one of the recessed region of the external wall and the transition area between the external wall and the rear wall at right angles.

2. The baggage container according to claim 1, wherein the air guiding element is designed and located to deflect the travel wind toward the rear wall.

3. The baggage container according to claim 1, wherein the air guiding element is disposed at a distance from the wall sections of the baggage container forming the transition area.

4. The baggage container according to claim 1, wherein the air guiding element has a lamellar cross-section.

5. The baggage container according to claim 1, further comprising a first retention element projecting from the external wall disposed in a transition area between one side wall and the external wall, and a second retention element projecting from the external wall disposed in another transition area between the other side wall and the external wall, ends of the air guiding element being attached to the two retention elements.

6. The baggage container according to claim 1, wherein the baggage container is a top case.

7. The baggage container according to claim 1, wherein the baggage container is a side case, the side walls of the baggage container forming one of an upper and a lower wall of the side case.

8. The baggage container according to claim 1, wherein the external wall sinks toward the rear wall in relation to the internal wall.

9. The baggage container according to claim 8, wherein the external wall sinks toward the rear wall at an angle of between 7° and 15° in relation to the internal wall.

10. A baggage container for a motorcycle, comprising:
an internal wall, which faces toward the motorcycle when the baggage container is attached to the motorcycle;
an external wall which faces away from the motorcycle when the baggage is attached to the motorcycle, the external wall being located diametrically opposite from the internal wall at a distance from the internal wall;
a front wall, which faces toward a forward area of the motorcycle when the baggage container is attached to the motorcycle;
a rear wall, which faces toward a rear direction relative to the motorcycle when the baggage container is attached to the motorcycle;
two side walls, each extending between the internal wall and the external wall;
a first air guiding element projecting from the external wall, disposed in a transition area between one of the two side walls and the external wall; and
a second air guiding element projecting from the external wall disposed in a transition area between the other of the two side walls and the external wall, ends of the first and second air guiding elements being attached to two retention elements;
a transition area between the external wall and the rear wall having a convexly curved shape, and wherein the air guiding elements are configured to guide a travel wind flowing along the external wall toward a center of a region behind the motorcycle when the baggage container is attached to the motorcycle, the air guiding elements each are located at their respective opposite ends on recessed surfaces of one of a recessed region of the external wall and a transition area between the external wall and the rear wall, the air guiding element has an interior side curved concavely like an airfoil, the concave interior side facing toward the transition area of the baggage container, and the opposite ends of the air guiding element meet the recessed surfaces of the one of the recessed region of the external wall and the transition area between the external wall and the rear wall at right angles, wherein an axis through the opposite ends of the air guiding element is transverse to a longitudinal axis of the motorcycle when the baggage container is attached to the motorcycle, and
the external wall sinks toward the rear wall in relation to the internal wall.

11. A motorcycle having a baggage container, comprising:
an internal wall, which faces toward the motorcycle when the baggage container is attached to the motorcycle;
an external wall which faces away from the motorcycle when the baggage is attached to the motorcycle, the external wall being located diametrically opposite from the internal wall at a distance from the internal wall;
a front wall, which faces toward a forward area of the motorcycle when the baggage container is attached to the motorcycle;
a rear wall, which faces toward a rear area of the motorcycle when the baggage container is attached to the motorcycle;
two side walls, which each extend between the internal wall and the external wall;
a transition area between the external wall and the rear wall having a convexly curved shape; and
an air guiding element, for guiding a travel wind flowing along the external wall toward a center of a region behind the motorcycle when the baggage container is attached to the motorcycle, wherein the air guiding element is located at its opposite ends on recessed surfaces of one of a recessed region of the external wall and a transition area between the external wall and the rear wall, and an axis through the opposite ends of the air guiding element is transverse to a longitudinal axis of the motorcycle when the baggage container is attached to the motorcycle, the air guiding element has an interior side curved concavely like an airfoil, the concave interior side facing toward the transition area of the baggage container, and the opposite ends of the air guiding element meet the recessed surfaces of the one of the recessed region of the external wall and the transition area between the external wall and the rear wall at right angles.

12. The motorcycle according to claim 11, wherein the baggage container is one of a top case and a side case.

* * * * *